Feb. 20, 1940.  G. F. TURNER  2,191,294

FASTENING MEANS FOR DETACHABLY SECURING HANDLES TO OPERATING SHAFTS

Filed May 1, 1937

Inventor:
George Turner,
By Wilkinson, Huxley, Byron, & Knight
Attys

Patented Feb. 20, 1940

2,191,294

UNITED STATES PATENT OFFICE 2,191,294

FASTENING MEANS FOR DETACHABLY SECURING HANDLES TO OPERATING SHAFTS

George F. Turner, Chicago, Ill., assignor to Harper-Wyman Manufacturing Company, Chicago, Ill., a corporation of Illinois Application May 1, 1937, Serial No. 140,105

1 Claim. (Cl. 287—53)

This invention relates to a new and improved means for detachably securing a handle to a shaft or stem of the type employed for manually actuating or adjusting various types of devices or instruments. The invention is herein illustrated as applied to the stem and handle of a gas range valve but it will be apparent that the invention may be applied with equal advantage to all similar stems or operating shafts such as those used for radio parts, controls on automobiles and other similar appliances.

It is an object of this invention to provide an improved stem or shaft construction, preferably of nonround cross section, together with a handle therefor having a socket of corresponding shape adapted to fit on the stem or shaft so that the shaft may be readily turned by means of such handle. The shaft is also provided with attaching means which establishes a strong frictional engagement with the inner surface of the handle socket whereby the handle in use, is maintained against accidental displacement while at the same time, is capable of being removed from the stem by a forced movement in an axial direction and of being applied to the stem of the shaft by an axial thrust in the opposite direction. This invention provides a very convenient and satisfactory means for mounting such operating handles particularly in cases where it is desirable to be able to quickly remove such handles to enable the removal of other parts of the apparatus to which the handle and stem construction is applied.

The present invention is designed to eliminate the difficulties inherent in the devices heretofore used, and to provide a frictional holding means for detachably securing a handle to an operating stem or shaft which will effectively hold the handle against accidental displacement and yet will permit the handle to be readily applied and removed by a forced axial movement. Also, the construction of this invention will permit the handle to be easily applied to the shaft and held with increased frictional resistance as the handle is thrust further onto the shaft into place.

The invention is here illustrated as applied to a valve of the type suitable for use on gas ranges and the like and a better understanding of the invention may be had by referring to the illustrative embodiment as disclosed in the accompanying drawing, in which:

Figure 3 is an elevational view of the construction illustrated in Figure 1;

Figure 4 is an end view of the handle shown in Figure 3;

Figure 1:
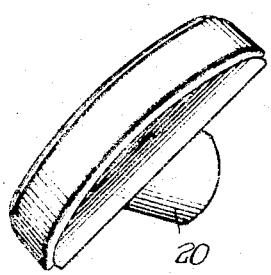
Figure 1 is a perspective view of a valve and operating handle embodying attaching means constructed in accordance with this invention.
Figure 1:
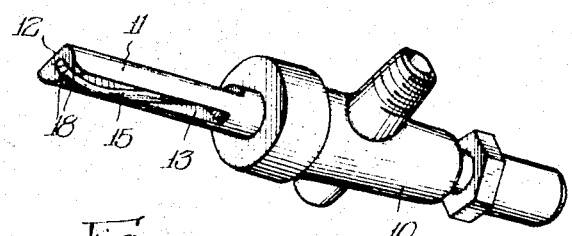

By referring to the drawing, it will be noted that the invention is shown as embodied in a valve 10, having an operating stem 11, which is of non-round cross section and in this particular instance, is shown as having a D-shaped cross section with the flat surface 12 cut on one side, and having a groove, as at 13, extending all the way to the outer end of the shaft. This groove may be provided at any point in the circumference of the shaft but is preferably located on the diameter which extends perpendicular to the flat side 12 so that the spring placed therein as hereinafter described, will urge the flat faces of the operating shaft and the handle socket in tight holding engagement.

Figure 2:
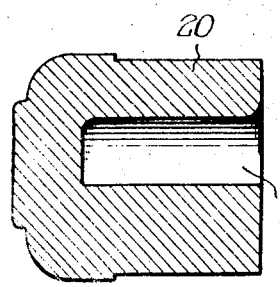
Figure 2 is a cross sectional view of the stem and handle construction illustrated in Figure 1.
Figure 2:
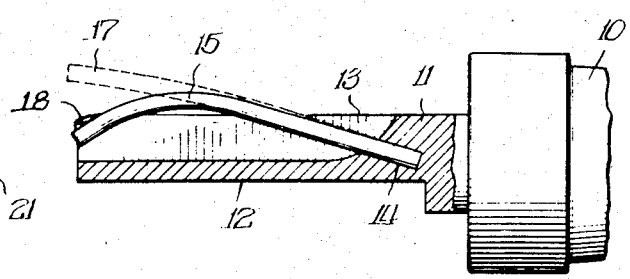
Figure 2:
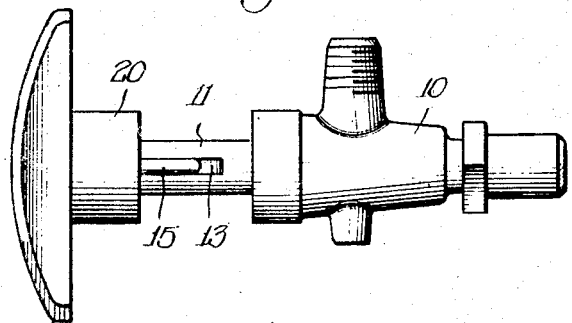
Figure 2:
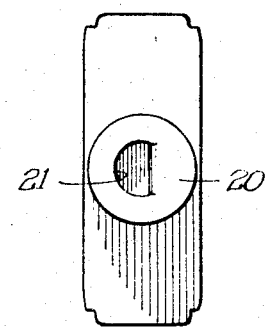
Figure 2:
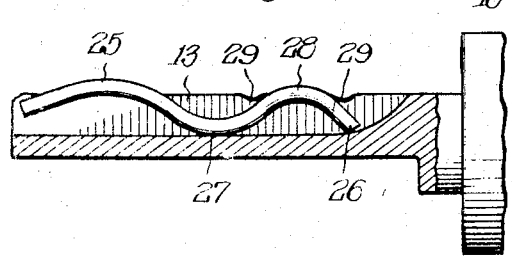
Figure 2:
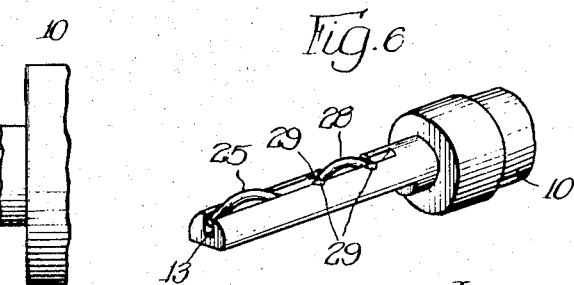

An opening 14 is preferably drilled in the shaft adjacent the back lower end of the groove 13 which opening is adapted to receive and hold the end of the friction spring 15. The friction spring 15 is preferably formed of substantially the configuration shown in Figure 2, and has its inner end inserted and held in the opening 14 and as originally formed and inserted, normally projects upwardly and occupies a position as represented by the dotted line 17. After it is located in the hole 14 it is next forced downwardly to the position shown in full lines and held in such depressed position under slight initial tension by the holding lugs or lips 18 which are peened over at the end of the shaft.

It will be apparent from an inspection of Figure 1 that the peened lugs 18 not only hold the outer end of the spring 15 in its proper depressed position under initial tension but also cause the inner end of the spring to exert a twisting action in the opening 14 so that the same is securely held against accidental displacement. It will be apparent that the spring forms a resilient cantilever member which may be given any desired configuration so as to exert any particular type of frictional holding action that may be desired in the particular case at hand. For instance, the spring may be high in front or it may taper very gradually toward a higher point toward the back end of the spring and by such variations considerable latitude of operation is possible. In the form illustrated, the spring has been designed to permit the handle to be easily started on the shaft and to then exert an increasing frictional resistance to the axial movement of the handle as the handle approaches its final position.

The handle may be of any suitable type but as here illustrated, comprises a T-shaped member conveniently formed for manual operation and having a hub 20 provided with a socket 21. The socket 21 as shown in Figure 4, is of D-shaped cross section adapted to fit on the operating stem or shaft and be held thereon so that there is no relative rotation between them. The handle may be made of any suitable material such as molded resins, metal or the like, and when molded from resins, the socket 21 may or may not be provided with a metallic lining.

Furthermore, it is not necessary to provide any depression, groove or any other special means on the inner surface of the socket 21 of the handle as the holding depends only upon the engagement of the spring 15 with the inner surface of the socket.

The spring 15 may be made of any suitable spring metal but it has been found that very good results are realized when steel wire stock is employed with a cadmium plated surface. The steel gives the proper strength and resilience for the body of the spring and the cadmium plating on the surface provides a smooth, greasy-like surface which permits the handles to be readily applied and removed from the shafts without disturbing the strong frictional holding action required for use.

It will be observed that the construction of this invention provides a bearing contact between the frictional spring and the inner surface of the handle socket over a relatively large area and in addition that the holding spring is capable of operating with handles which have some variation in the sockets. It will be apparent that considerable latitude is possible through the selection of different sizes and shapes of wire for the friction spring so that any desired type of friction holding action can be established. Furthermore, the construction has great durability and the spring will not lose its strength or take a permanent set during use.

Finally, the cadmium coating on the wire provides a smooth, lubricated surface which permits the handle to be easily slipped onto and removed from the shaft without impairing the strong frictional holding action established by the spring itself.

I claim:

A device of the character described, comprising a shaft, a socketed handle therefor, said shaft and handle socket being non-round in cross section, means for detachably holding said handle on said shaft comprising a longitudinal groove in said shaft, a hole in said shaft adjacent the inner end of said groove, a spring wire having its inner end mounted in said hole and extending longitudinally upwardly and outwardly in said groove, and means extending into said groove disposed in engagement with the outer end of said spring wire, said spring wire being maintained under tension between its inner end which is mounted in said hole and its outer point of engagement with said means extending into said groove, said spring wire further having its central portion projecting above the exterior surface of said shaft and its outer ends normally maintained out of contact with the bottom of said groove.

GEORGE F. TURNER.